W. R. RANTZ.
AUTOMOBILE SPRING.
APPLICATION FILED NOV. 13, 1907.

900,779.

Patented Oct. 13, 1908.
2 SHEETS—SHEET 1.

Witnesses
C. E. Smith.
E. B. McBath.

Inventor
W. R. Rantz.
By O'Meara & Broch
Attorneys

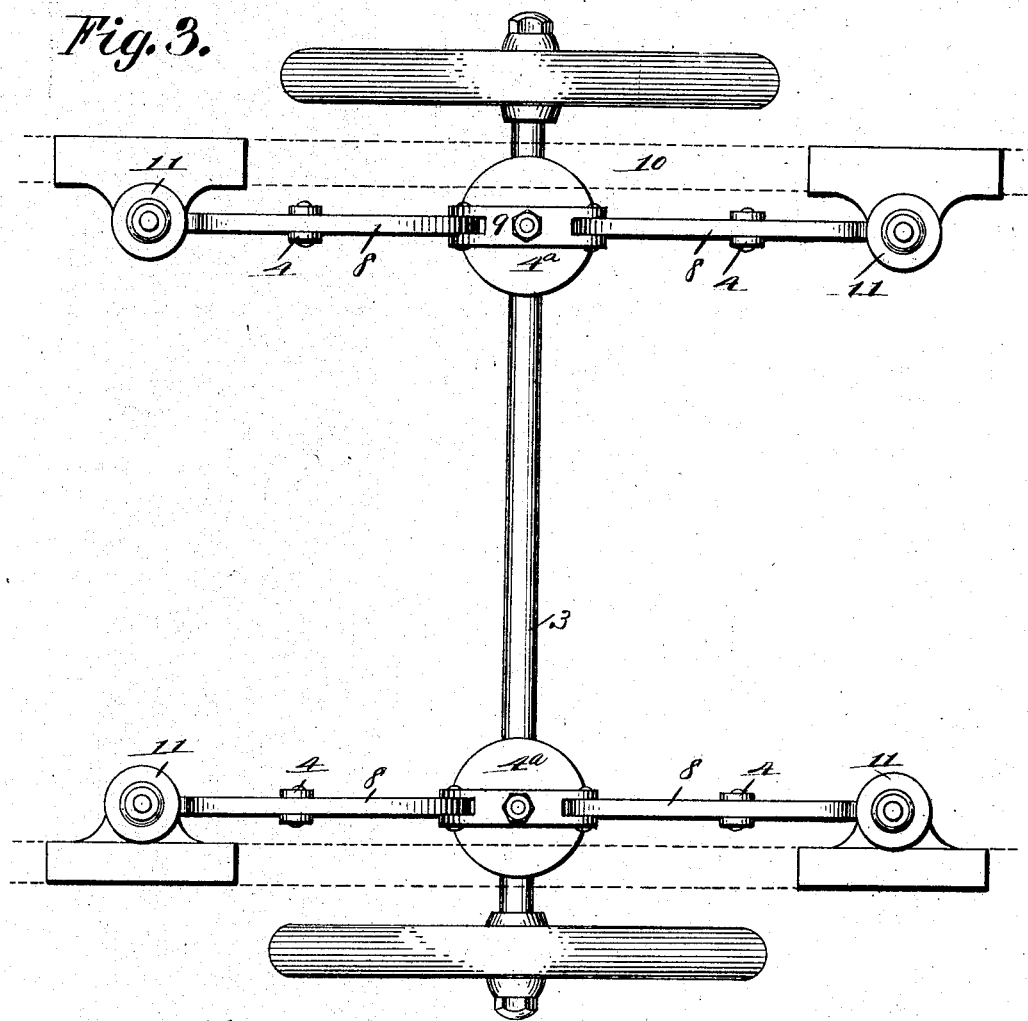

UNITED STATES PATENT OFFICE.

WILLIAM RUSSEL RANTZ, OF GREENVILLE, OHIO.

AUTOMOBILE-SPRING.

No. 900,779.　　　　Specification of Letters Patent.　　　Patented Oct. 13, 1908.

Application filed November 13, 1907. Serial No. 402,007.

*To all whom it may concern:*

Be it known that I, WILLIAM RUSSEL RANTZ, a citizen of the United States, residing at Greenville, in the county of Darke and State of Ohio, have invented a new and useful Improvement in Automobile-Springs, of which the following is a specification.

This invention relates to springs especially designed for use in connection with automobiles, but adapted also for use with vehicles of all kinds.

Figure 1:
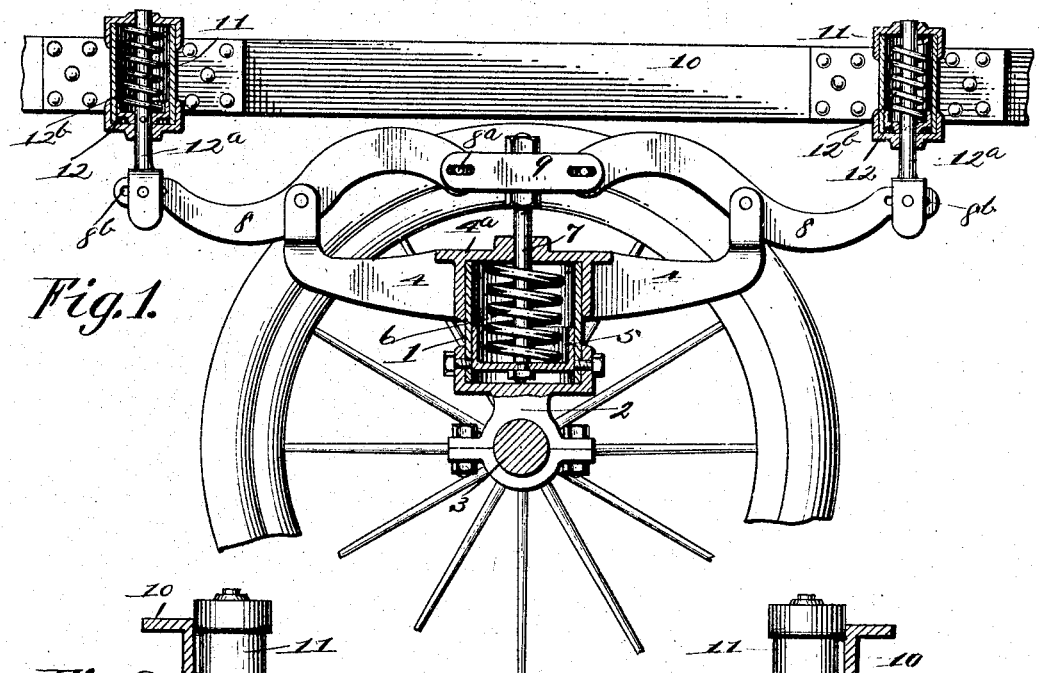
Figure 2:
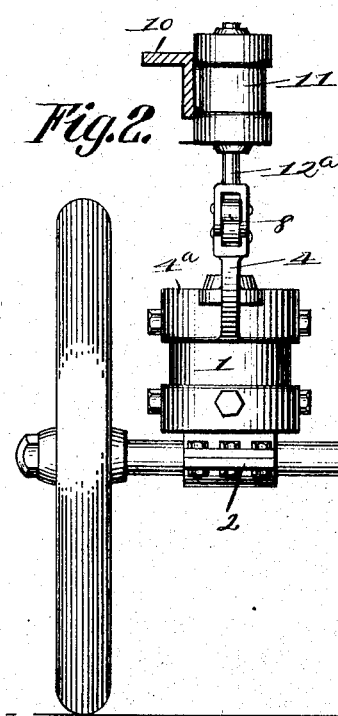
Figure 2:
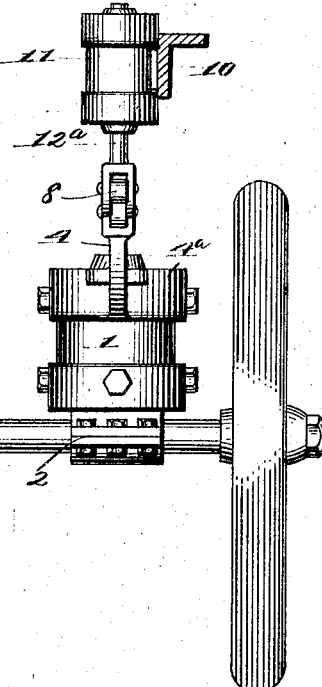

The invention consists of the novel features of construction hereinafter described, pointed out in the claims and shown in the accompanying drawings, in which Figure 1 is a sectional side view of one of the springs. Fig. 2 is a front view, an angle beam being shown in cross section. Fig. 3 is a plan view of a set of springs. Fig. 4 is a side elevation showing a slight modification. Fig. 5 is a section on the line 5—5 of Fig. 4.

In constructing the invention I secure a cylinder 1 by means of a split base 2 to an axle 3. It is to be understood that in applying the device to an automobile the parts hereinafter described are duplicated upon opposite sides and also at the front and rear. The cylinder 1 is provided with oppositely extending bracket arms 4 carried by a flanged cap portion 4$^a$ of the cylinder and within the cylinder is arranged a piston 5 which is provided with a piston rod 7 about which is coiled a spring 6 which bears upon the cap 4$^a$ and upon the piston 5. To upturned end portions of the arms 4 are pivoted intermediate their ends S-shaped levers 8 the inner ends of which are loosely connected to a block 9 carried by the piston rod 7. Preferably, I prefer to bifurcate the ends of the block and slot the bifurcated portion and pass pins 8$^a$ through the levers 8, said pins working in the slots of the block. To any suitably constructed portion of the body 10 of the vehicle, I secure by any suitable means cylinders 11 in which work pistons 12 provided with piston rods 12$^a$ and with springs 12$^b$ corresponding to the springs 6. The lower ends of the piston rods 12$^a$ are bifurcated and fit over the end portions of the levers 8 which are slotted as shown at 8$^b$, the pivot pins securing the piston rods to said levers passing loosely through the slots. In Fig. 4 I have shown a slight modification in which the levers 8 are supplanted by compound curved levers 13 which are connected by suitable links 14 to a block 15 carried by the piston 7 instead of being connected directly to the block itself. Otherwise the construction is the same as that already described.

It will be noted that a spring device constructed as shown and described will give the yielding action of a spring board, all jars being taken up by the springs 6 and 12$^b$ and the strain and stress upon said springs being to a great extent removed by the yielding or rocking motion of the levers 8 or 13, there being no rigid connections between any portion of the body of the vehicle and the axles.

It will be obvious that the parts may be changed in shape and size to adapt them to cars of different types and sizes and also that any suitable form of bracket or hanger may be employed to connect the device to the style of body used.

Having thus fully described my invention, what I claim as new and desire to secure by Letters Patent, is:—

1. A device of the kind described comprising three spring pressed piston rods, one of said rods being arranged below and between the others, and curved levers pivotally connected intermediate their ends and having their end portions loosely connected to said piston rods.

2. In a device of the kind described, three cylinders, one cylinder being carried by a vehicle axle and two by a vehicle body, bracket arms supported from the vehicle axle, and levers pivoted upon said arms, spring pressed piston rods in said cylinders, and means loosely connecting the inner ends of said levers to the piston rod of the cylinder supported by the axle, the outer ends of said levers being pivotally connected respectively to the other piston rods.

3. A spring for automobiles comprising a cylinder carried by the axle, cylinders supported from the body, and upon opposite sides of the axle cylinder, spring pressed pistons in said cylinders, piston rods, a block carried by the piston rod of the axle cylinder, bracket arms carried by the axle cylinder, and S-shaped levers pivoted upon said arms, the ends of said levers being loosely connected respectively to the block of the axle piston rod and to the lower ends of the other piston rods.

WILLIAM RUSSEL RANTZ.

Witnesses:
 T. C. MILLER,
 W. E. FLUSKEY.